US009218365B2

(12) United States Patent
Irani et al.

(10) Patent No.: US 9,218,365 B2
(45) Date of Patent: Dec. 22, 2015

(54) DEVICE, SYSTEM, AND METHOD OF VISUAL INFERENCE BY COLLABORATIVE COMPOSITION

(71) Applicant: Yeda Research and Development Co. Ltd., Rehovot (IL)

(72) Inventors: Michal Irani, Rehovot (IL); Alon Faktor, Rehovot (IL)

(73) Assignee: YEDA RESEARCH AND DEVELOPMENT CO. LTD., Rehovot, IL (US)

(*) Notice: Subject to any disclaimer, the term of this patent is extended or adjusted under 35 U.S.C. 154(b) by 393 days.

(21) Appl. No.: 13/712,982

(22) Filed: Dec. 13, 2012

(65) Prior Publication Data

US 2013/0156348 A1 Jun. 20, 2013

Related U.S. Application Data

(60) Provisional application No. 61/570,851, filed on Dec. 15, 2011.

(51) Int. Cl.
| | | |
|---|---|---|
| *G06K 9/54* | (2006.01) | |
| *G06K 9/60* | (2006.01) | |
| *G06F 17/30* | (2006.01) | |
| *G06K 9/00* | (2006.01) | |
| *G06K 9/46* | (2006.01) | |
| *G06K 9/62* | (2006.01) | |

(52) U.S. Cl.
CPC .... *G06F 17/30244* (2013.01); *G06F 17/30259* (2013.01); *G06K 9/00677* (2013.01); *G06K 9/4676* (2013.01); *G06K 9/6215* (2013.01); *G06K 9/6218* (2013.01)

(58) Field of Classification Search
CPC ............ G06K 9/00677; G06K 9/4676; G06K 9/6215; G06K 9/6218; G06F 17/30244; G06F 17/30259
See application file for complete search history.

(56) References Cited

U.S. PATENT DOCUMENTS

| | | | |
|---|---|---|---|
| 5,867,799 A * | 2/1999 | Lang et al. | |
| 6,230,154 B1 | 5/2001 | Raz et al. | |
| 6,240,424 B1 | 5/2001 | Hirata | |
| 6,314,420 B1 * | 11/2001 | Lang et al. | |
| 7,035,848 B2 * | 4/2006 | Shapiro et al. | |
| 7,792,887 B1 | 9/2010 | Amirghodsi | |
| 7,860,854 B2 | 12/2010 | Lipson et al. | |
| 7,996,395 B2 | 8/2011 | Li et al. | |
| 2003/0018631 A1 | 1/2003 | Lipson et al. | |

(Continued)

OTHER PUBLICATIONS

C. Barnes et al., "Patchmatch: A randomized correspondence algorithm for structural image editing", SIGGRAPH 2009.

(Continued)

*Primary Examiner* — Phuoc Tran
(74) *Attorney, Agent, or Firm* — Mark S. Cohen; Pearl Cohen Zedek Latzer Baratz, LLP

(57) ABSTRACT

Device, system, and method of visual inference by collaborative composition. A method of searching for similar target content-items for a plurality of source content-items, the method implementable on a computing device, comprises: for each of said plurality of source content-items, searching for similar target content-items in a dataset, while taking into account collaborative feedback exchanged among at least some of currently-searched said plurality of source content-items.

26 Claims, 5 Drawing Sheets

(56) References Cited

U.S. PATENT DOCUMENTS

2004/0019651 A1* 1/2004 Andaker ................ 709/207
2011/0137844 A1* 6/2011 Miranda et al. ............ 706/47

OTHER PUBLICATIONS

O. Boiman et al., "Similarity by composition", NIPS 2006.
O. Boiman et al., "In defense of nearest-neighbor based image classification", CVPR 2008.
D. Daj et al., "Discovering scene categories by information projection and cluster sampling", CVPR 2010.
N. Dalal et al., "Histograms of oriented gradients for human detection", CVPR 2005.
D. Dueck et al., "Non-metric affinity propagation for unsupervised image categorization", ICCV 2007.
K. Grauman et al., "Unsupervised learning of categories from sets of partially matching image features", CVPR 2006.
C. Gu et al., "Recognition using regions", CVPR 2009.
G. Kim et al., "Unsupervised modeling of object categories using link analysis techniques", CVPR 2008.
Y. Lee et al., "Foreground focus: Unsupervised learning from partially matching images", IJCV 2009.
Y. Lee et al., "Shape discovery from unlabeled image collections", CVPR 2009.
N. Payet et al., "From a set of shapes to object discovery", ECCV 2010.
B.C. Russell et al., "Using multiple segmentations to discover objects and their extent in image collections", CVPR 2006.
E. Shechtman et al., "Matching local self-similarities across images and videos", CVPR 2007.
J. Shi et al., "Normalized cuts and image segmentation", TPAMI 2000.
J. Sivic et al., "Discovering objects and their localization in images", ICCV 2005.
A. Faktor et al., "Visual inference by collaborative composition", ECCV, Oct. 2012.
S. Altschul et al., "Basic local alignment search tool", JMolBiol, 215:403-410, 1990.
J. Lazebnik et al., "Beyond bags of features: Spatial pyramid matching for recognizing natural scene categories", CVPR06.
D. Lowe, "Distinctive image features from scale-invariant keypoints", IJCV, 60(2):91-110,2004.
J. Shi et al., "Normalized cuts and image segmentation", PAMI, 22(8):888-905, Aug. 2000.
P. Viola et al., "Alignment by maximization of mutual information", In ICCV95, pp. 16-23.
Freeman et al., "Learning low-level vision" IJCV, 2000.
Yedidia et al., "Understanding belief propagation and its generalizations", pp. 239,269, 2002.
S. Belongi et al., "Matching Shapes", ICCV, Jul. 2001.
T. H Corman et al., "Introduction to Algorithms", MIT Press and McGraw-Hill 1994.
R. Haralick et al., "Textural features for image classification", IEEE T-SMC, 1973.
N. Jojic et al., "Capturing image structure with probabilistic index maps." In CVPR, 2004.
C. Stauffer et al., "Similarity templates for detection and recognition." In CVPR, 2001.
L. Wolf et al., "Patch-based texture edges and segmentation", In ECCV, 2006.
G. Loy et al., "Detecting symmetry and symmetric constellations of features", In ECCV, 2006.
C. Benabdelkader et al., "Gait recognition using image self-similarity", EURASIP Journal on Applied Signal Processing, 2004(4), 2004.
Ullman et al., "A fragment-based approach to object representation and classification", Proc. 4th International Workshop on Visual Form, 2001.
Malik et al., "Textons, contours and regions: Cue integration in image segmentation", ICCV, 1999.
Schiele et al., "Recognition without correspondence using multidimensional receptive field histograms", IJCV, 36 (1), 31-52, 2000.
Laptev et al., "Space-time interest points", ICCV, 2003.
K. Mikolajczyk et al., "A performance evaluation of local descriptors", PAMI, 27(10):1615-1630, 2005.
V. Ferrari et al., "Object detection by contour segment networks", In ECCV, May 2006.
Serre et al., "Robust object recognition with cortex-like mechanisms", PAMI, 2006.
P. Hover, "Non-negative matrix factorization with sparseness constraints", Journal of Machine Learning Research. 5:1457-1469, 2004.
Jacobs et al., "Fast multiresolution image querying", In SIGGRAPH, 1995.
Haffner et al., "Efficient color histogram indexing for quadratic form distance", PAMI, 17(7), 1995.
P. Viola et al., "Rapid object detection using a boosted cascade of simple features", CVPR 2001.
Y. Wexler et al., "Space-Time Video Completion", CVPR 2004.
A. Hertzmann et al., "Image Analogies", SIGGRAPH 2001.
R. Fergus et al., "Object Class Recognition by Unsupervised Scale-Invariant Learning", Proceedings of the IEEE Conference on Computer Vision and Pattern Recognition, Jun. 2003.
B. Leibe et al., "Interleaved Object Categorization and Segmentation", British Machine Vision Conference, Sep. 2003.
Hubo et al., "Self-Similarity-Based Compression of Point Clouds,with Application to Ray Tracing", Eurographics Symposium on Point-based graphics, 2007.
Buades et al., "A non-local algorithm for image denoising".
Boiman et al., "Detecting Irregularities in Images and in Video", ICCV 2005 IEEE, pp. 462-469 vol. 1.

* cited by examiner

DEVICE, SYSTEM, AND METHOD OF VISUAL INFERENCE BY COLLABORATIVE COMPOSITION

CROSS-REFERENCE TO RELATED APPLICATIONS

The application claims priority and benefit from U.S. application 61/570,851, entitled "Visual Inference by Collaborative Composition", filed on Dec. 15, 2011, which is hereby incorporated by reference in its entirety

FIELD

The present invention relates to the field of image processing.

BACKGROUND

A fundamental problem in computer vision is that of unsupervised discovery of visual categories in a collection of images. This is usually approached by applying image clustering to the image collection, thereby grouping the images into meaningful clusters of shared visual properties (e.g., shared objects or scene properties). The clustering process aims to find the underlying structures and to exploit such structures in order to partition the image collection into clusters of "similar" images.

One clustering method for unsupervised category discovery relies on pairwise affinities between images, using a Pyramid Match Kernel. However, these affinities may typically not be sufficiently strong in order to capture complex visual similarity between images. Other methods may utilize simple pairwise affinities which are refined iteratively until a "common cluster model" emerges. Such common cluster models may be common segments, common contours, common distribution of descriptors, or representative cluster descriptors.

SUMMARY

The present invention may include, for example, devices, systems, and methods of visual inference by collaborative composition.

In accordance with the present invention, for example, a method of searching for similar target content-items for a plurality of source content-items may be implementable on a computing device. The method may comprise, for example: for each of said plurality of source content-items, searching for similar target content-items in a dataset, while taking into account collaborative feedback exchanged among at least some of currently-searched said plurality of source content-items.

In accordance with the present invention, for example, said plurality of source content-items are contained in said dataset of target content-items.

In accordance with the present invention, for example, said searching comprises: measuring similarity between each one of said source content-items and a small subset of target content-items in said dataset, wherein said small subset is unique to each one of said source content-items and is determined by collaborative feedback exchanged among said plurality of source content-items.

In accordance with the present invention, for example, said searching comprises computing similarity-by-composition, wherein said computing similarity-by-composition comprises measuring similarity of detected shared regions among said source content-items and said target content-items.

In accordance with the present invention, for example, detecting said shared regions comprises: for source descriptors of a source content-item, randomly sampling target descriptors among target content-items; and propagating good matches of source-target descriptors to neighboring descriptors in said source content-item and in one or more matching target content-items.

In accordance with the present invention, for example, said randomly sampling comprises at least one of: uniform random sampling, and randomly sampling by utilizing a modifiable sampling distribution.

In accordance with the present invention, for example, the method comprises: dynamically modifying said modifiable sampling distribution between two consecutive search iterations, based on said collaborative feedback.

In accordance with the present invention, for example, said modifiable sampling distribution is specific to said source content-item.

In accordance with the present invention, for example, said detected shared regions are at least one of: large shared regions, and statistically significant regions.

In accordance with the present invention, for example, said measuring similarity of detected shared regions comprises computing a likelihood ratio according to an equation:

$$\text{Likelihood Ratio } (R) = \frac{p(R \mid Ref)}{p(R \mid H_0)}$$

wherein R is a region in one of said source content-items, wherein Ref is one of said target content-items which shares a similar region, wherein $p(R \mid Ref)$ measures a degree of similarity between said region R in said source content-item and said similar region in said target content-item, wherein $p(R \mid H_0)$ measures a likelihood of said region R to occur at random.

In accordance with the present invention, for example, said degree of similarity is a function of at least one of the following: sum-of-differences, sum-of-squared differences, sum-of-absolute-differences, an Lp norm measure, mutual information, correlation, normalized correlation, a robust measure, a histogram comparison measure, a motion consistency measure, and a probability measure.

In accordance with the present invention, for example, $p(R \mid X) = \Pi_i p(d_i \mid X)$, wherein said $d_i$ are descriptors composing said region R.

In accordance with the present invention, for example, said descriptors are at least one of: an image descriptor, a Scale-Invariant Feature Transform (SIFT) descriptor, a Speeded Up Robust Features (SURF) descriptor, a Histogram Oriented Gradients (HOG) descriptor, a shape-context descriptor, a self-similarity descriptor, a local-binary pattern descriptor, a color descriptor, a greyscale descriptor, a normalized color descriptor, a normalized greyscale descriptor, a gradient based descriptor, a normalized gradient based descriptor; a video descriptor, a HOG-3D descriptor, a Histogram of Optical Flow (HOF) descriptor, a flow field based descriptor, a normal flow based descriptor, a motion based descriptor, a temporal derivative based descriptor, a normalized temporal derivative based descriptor; an audio descriptor, a spectrogram based descriptor, a Cepstrum based descriptors, a Mel-Frequency Cepstral Coefficient (MFCC), a Short Time Fourier Transform (STFT) descriptor, a Constant Q-Transform (CQT) descriptor, a descriptor in the spectral domain of an audio signal.

In accordance with the present invention, for example, said $p(R|H_0)$ is estimated by utilizing an error of descriptors composing said region R with respect to a quantized codebook of descriptors.

In accordance with the present invention, for example, wherein said error of at least one of said descriptors is an error computed with respect to at least one nearest neighbor of said at least one of said descriptors in said quantized codebook.

In accordance with the present invention, for example, the method comprises: generating said quantized codebook from a collection of descriptors by at least one of: k-means clustering of said collection of descriptors, hierarchal clustering of said collection of descriptors, random sampling from said collection of descriptors.

In accordance with the present invention, for example, said content-items comprise at least one of: images, video sequences, and audio items.

In accordance with the present invention, for example, said small subset comprises also a randomly sampled small subset generated by randomly sampling based on a sampling distribution; and said sampling distribution comprises at least one of: a uniform distribution, non-uniform distribution, and a dynamically modifiable sampling distribution based on said collaborative feedback.

In accordance with the present invention, for example, the method comprises: updating said modifiable sampling distribution, for a particular source content-item, by utilizing a function that comprises at least one of the following: a first sampling distribution component corresponding to a subset in which said particular source content-item found other similar content items; a second sampling distribution component corresponding to a subset in which another, similar, content-item found similar content-items; and a third sampling distribution component corresponding to uniform sampling of said dataset.

In accordance with the present invention, for example, said small subset comprises one or more target content-items that are suggested for searching based on collaborative feedback from one or more source content-items.

In accordance with the present invention, for example, the collaborative feedback comprises suggestions obtained from source content-items indicating to each other where to sample in said dataset in a subsequent search iteration.

In accordance with the present invention, for example, the collaborative feedback comprises at least a sparse set of meaningful affinities among source content-items.

In accordance with the present invention, for example, the method comprises: based on affinity output of the searching, performing at least one of: content-item clustering, content-item classification, content-item retrieval, detecting informative content-items, localization of information within content-items, label transfer, annotation, and generating links between content-items.

The present invention may further include, for example, a computing device for searching for similar target content-items for a plurality of source content-items. The computing device may comprise, for example: a searcher module to search, for each of said plurality of source content-items, for similar target content-items in a dataset, while taking into account collaborative feedback exchanged among at least some of currently-searched said plurality of source content-items.

In accordance with the present invention, for example, said plurality of source content-items are contained in said dataset of target content-items.

In accordance with the present invention, for example, the computing device may comprise an affinity calculator to measure similarity between each one of said source content-items and a small subset of target content-items in said dataset, wherein said small subset is unique to each one of said source content-items and is determined by collaborative feedback exchanged among said plurality of source content-items.

In accordance with the present invention, for example, the affinity calculator computes similarity-by-composition by measuring similarity of detected shared regions among said source content-items and said target content-items.

In accordance with the present invention, for example, the computing device may comprise: a sampling module to randomly sample, for source descriptors of a source content-item, target descriptors among target content-items; and a propagation module to propagate good matches of source-target descriptors to neighboring descriptors in said source content-item and in one or more matching target content-items.

The present invention may provide other and/or additional benefits and/or advantages.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION OF SOME EMBODIMENTS

Figure 1:
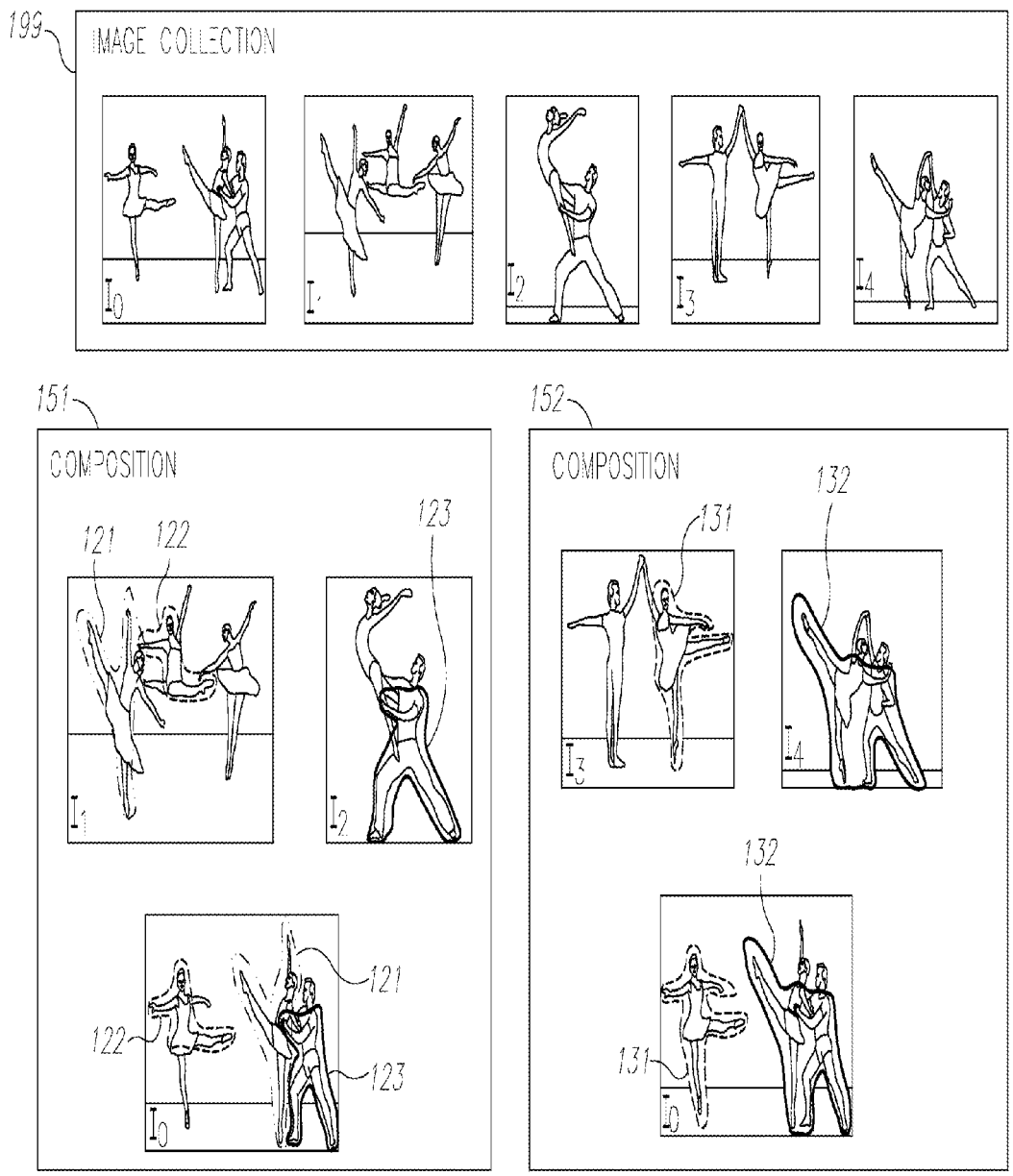
FIG. 1 is an illustration demonstrating image compositions in accordance with the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Applicants have realized that conventional image clustering methods fail to correctly operate on complex or challenging image collections. For example, an image collection may comprise multiple images of ballet dancers, and multiple images of yoga practitioners. Conventional image clustering methods fail to find any single "common model" shared by all images of the same category, i.e., the ballet category or the yoga category. For example, the poses of persons within images in each such category may vary significantly from one image to another image; and there may be significant foreground clutter (e.g., different clothes, multiple people, occlusions), as well as distracting backgrounds. Conventional methods for unsupervised "learning" of a shared "cluster model" may most likely fail, due to the large variability within each image category, and optionally due to a small number (e.g., twenty) of images per category. In the absence of an emerging "common cluster model", conventional methods may be dominated by their simple initial pairwise affinities.

In contrast, the present invention utilizes a method which does not seek a "common cluster model", but rather, utilizes sophisticated image affinities based on "Similarity by Composition". For example, although ballet poses may be different from each other, a first ballet pose may be relatively easily composed from pieces of other ballet poses.

Accordingly, the present invention may include an efficient method for visual inference of a collection of images, which may build upon collaborative feedback between the images. A collaborative feedback engine may allow images to "collaborate" with each other in finding similar images for one another. The collaborative feedback engine may allow images to "suggest" to each other where to search or sample, thereby reducing the overall search time significantly, as well as improving the search quality. Such "wisdom of crowds of images" may improve image search processes (e.g., in the Internet or in large data collections), and may improve visual inference.

The present invention may be applied, by extending space-time factors, to address video data, thereby allowing advanced visual inference of complex dynamic scenes and events captured on video. Furthermore, the present invention may be used in solving various inference problems, for example: unsupervised clustering or grouping of images/videos into complex visual categories, fast image/video search, image/video classification (unsupervised, semi-supervised, or supervised), labeling, annotation, object/action localization, recommendation of similar images/videos, or the like.

For demonstrative purposes, some portions of the discussion herein may demonstrate the present invention in the context of solving a problem of unsupervised clustering (or grouping) of images into complex visual categories. For example, a "good image cluster" may be a cluster in which images may be easily composed (e.g., similar to a toddler puzzle) using pieces from each other, while composition may be difficult from images outside the cluster. The larger and more statistically significant the pieces are, the stronger the affinity between the images. Multiple images may be composed from each other simultaneously and efficiently using a collaborative randomized search algorithm. This collaborative process may utilize a "wisdom of crowds of images" approach, to obtain a sparse yet meaningful set of image affinities, and in time which is linear in the size of the image collection. Such "Clustering-by-Composition" may be applied to very few images (where a cluster model may not be learned), as well as to large image datasets.

Reference is made to FIG. 1, which is an illustration demonstrating image compositions in accordance with the present invention. An image collection 199 may comprise five images denoted $I_0$ to $I_4$, each image depicting ballet dancers at various poses. As shown in a first composition 151, image $I_0$ may be "composed" of two elements 121-122 identified in image $I_1$ and one element 123 identified in image $I_2$. Additionally or alternatively, as shown in a second composition 152, image $I_0$ may be "composed" of one element 131 identified in image $I_3$ and one element 132 identified in image $I_4$. The elements need not be identical, but rather, may be sufficiently similar in order to allow identification of such composition(s).

The present invention may detect "statistically significant" regions which co-occur between images. "Statistically significant" regions may be, for example, image regions or image elements having a low chance of occurring at random. The reoccurrence of such regions across images may induce strong and meaningful image affinities, even if such recurring regions do not necessarily appear in numerous images and thus may not be identified as a "common model".

In accordance with the present invention, a "good image cluster" may be defined as an image cluster (or a group of images) in which each image may be easily composed using statistically significant pieces or elements from other images in that cluster, while at the same time, each image may be difficult to compose by using images outside that cluster. This type of clustering may be referred to as "Clustering by Composition". Multiple images may be composed from each other simultaneously and efficiently using a collaborative randomized search algorithm. Each image may be used in order to "suggest" to other images where to sample and search for similar regions within the image collection. This collaborative process may utilize "wisdom of crowds of images", to obtain a sparse yet meaningful set of image affinities, and in time which is linear in the size of the image collection. The "Clustering by Composition" approach may be applied to very few images (e.g., 5 images), as well as to large image datasets (e.g., hundreds of images or thousands of images) to achieve high-quality results.

In accordance with the present invention, image affinities may be based on "Similarity by Composition". As shown in FIG. 1, ballet image $I_0$ is composed of a few large and irregularly shaped regions from ballet images $I_1$ and $I_2$. This may induce strong affinities between images $I_0$ and $I_1$, $I_2$. The larger and more statistically significant those regions are (i.e., have low chance of occurring at random), the stronger the affinities.

It is noted that ballet image $I_0$ may probably be composed of yoga images as well. However, while the composition of image $I_0$ from other ballet images is relatively simple (e.g., similar to solving a "toddler puzzle" having few large pieces), the composition of image $I_0$ from yoga images is more complicated (e.g., similar to solving a puzzle for adults from dozens or hundreds of minuscule pieces), resulting in low affinities. These affinities may be quantified, as discussed herein, in terms of the "Description Length" of the composition and its induced "savings in bits".

To obtain reliable clustering, each image should have "good compositions" from multiple images in its cluster, resulting in high affinity to many images in the cluster. FIG. 1 demonstrates two different "good compositions" 151-152 of image $I_0$.

It is noted that "good regions" employed in the composition are typically not "good image segments". A "good region" is not confined by image edges, may be a part of a segment, or may contain multiple segments. Therefore, such regions may not be extracted ahead of time by utilizing image segmentation. Image regions are regarded as "good regions" not because of them being "good segments", but rather, because they co-occur across images while also being statistically significant or non-trivial.

In accordance with the present invention, "good regions" may be image-specific, and not cluster-specific. A region may co-occur only once, yet still provide strong evidence to the affinity between two images. Such an infrequent region may not be discovered as a common cluster shape from the image collection. Employing the co-occurrence of non-trivial large regions, may allow taking advantage of high-order statistics and geometry, even if infrequent, and without the necessity to model it. Accordingly, the present invention may be able to handle very small datasets with very large diversity in appearance.

Figure 2A:
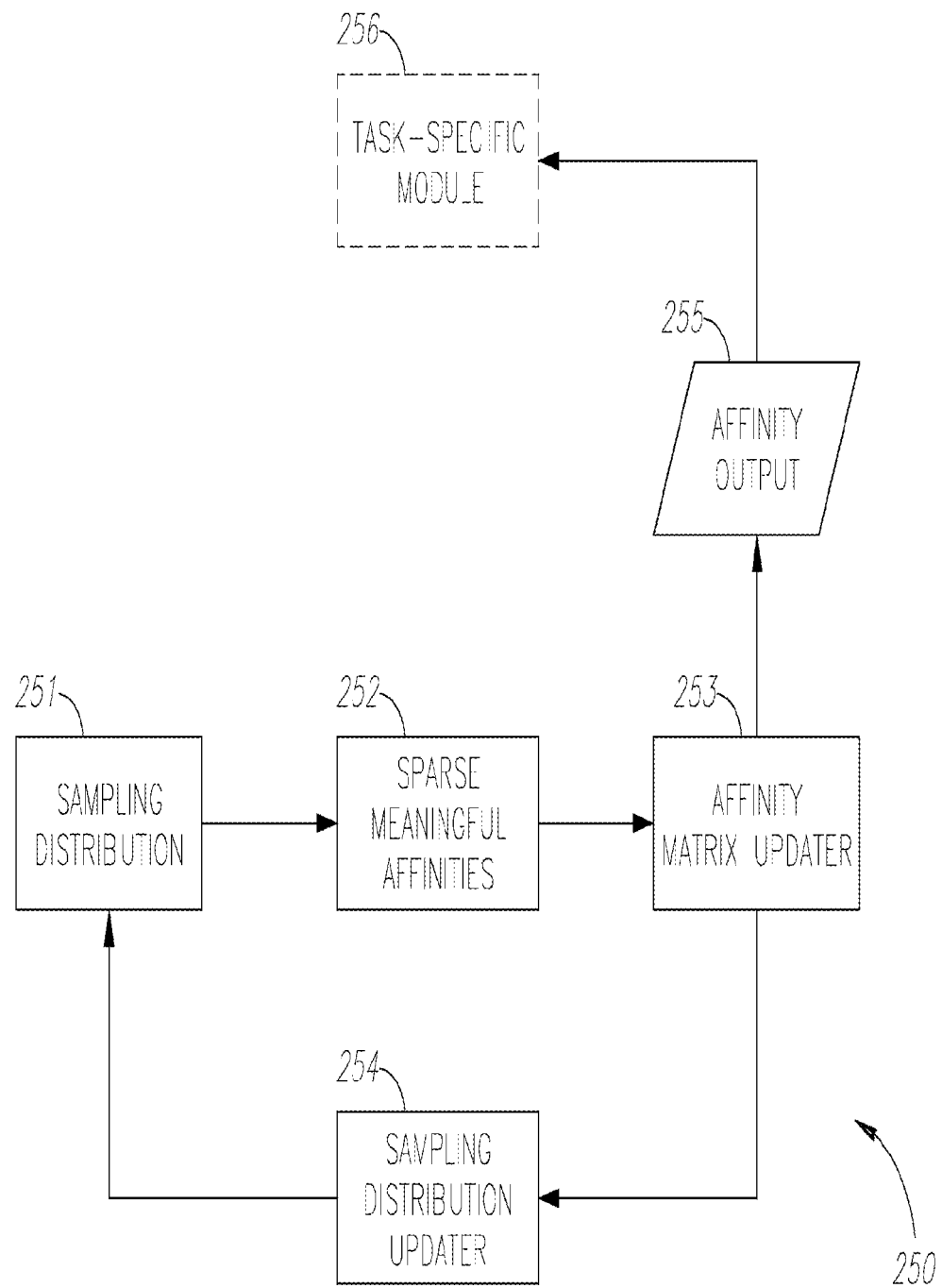
FIG. 2A is a schematic high-level illustration of a demonstrative implementation of a signal processing device, in accordance with the present invention.

Reference is made to FIG. 2A, which is a schematic high-level illustration of a demonstrative implementation of a signal processing device 250, in accordance with the present invention. Device 250 may comprise, for example, a sampling distribution 251, an affinity matrix updater 253, a sampling distribution updater 254 and a task-specific module 256 (e.g., a Normalized Cut (N-Cut) module or other suitable module). Sampling distribution 251 may search images in a dataset to generate sparse meaningful affinities 252 among such images. Affinity matrix updater 253 may calculate and/or update an affinity matrix of affinities 252 and may provide the matrix to sampling distribution updater 254. Sampling distribution updater 254 may update the sampling distribution 251, in an iterative process. After one or more iterations, task-specific module 256 may utilize an affinity output 255 of affinity matrix updater 253 for one or more image processing or content processing purposes, for example, for image clustering purposes or for other suitable content processing tasks. The particular operation of the algorithm utilized by device 250 is discussed further herein, with reference to FIG. 2B and the equations that follow herein.

Figure 2B:
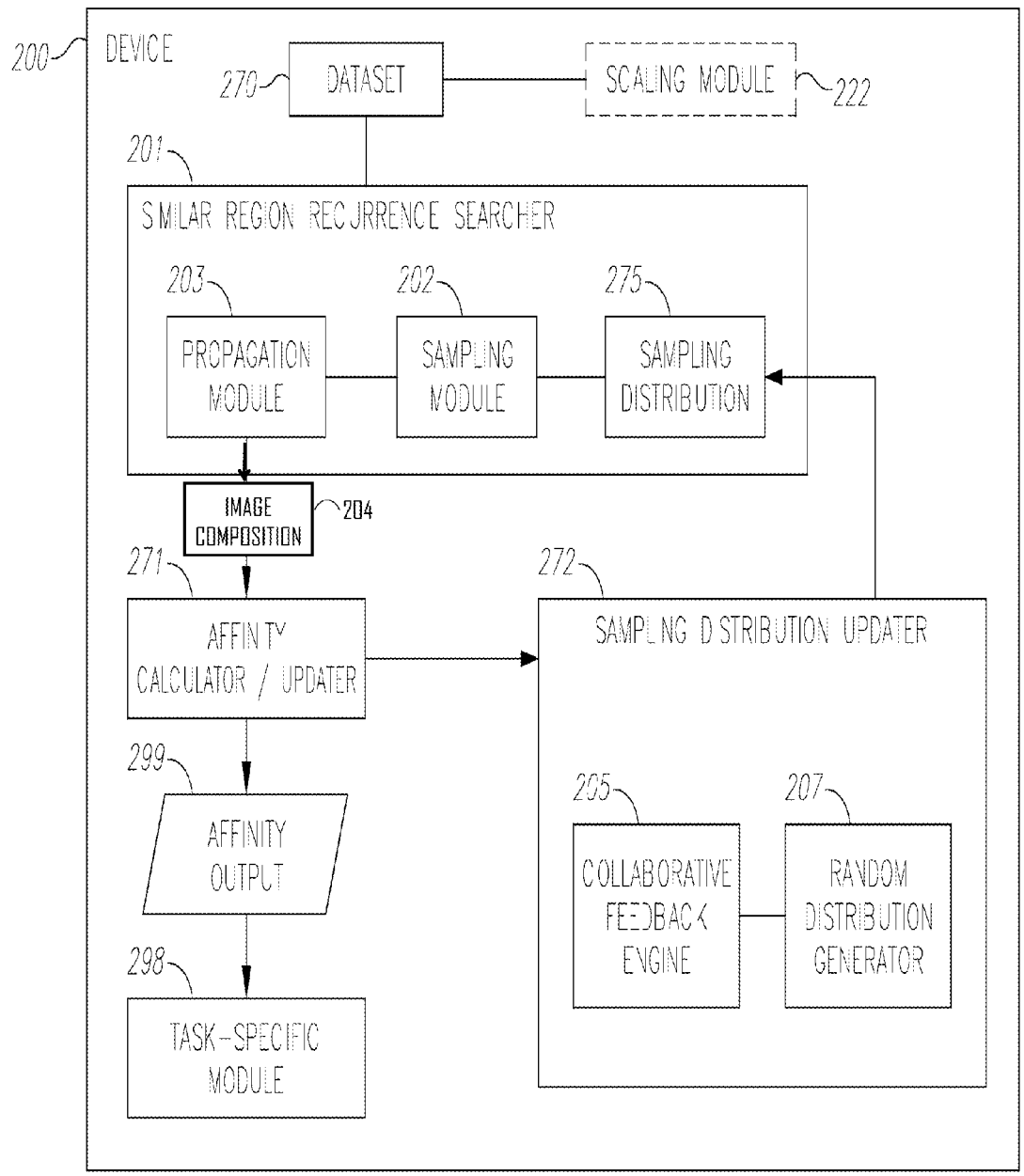
FIG. 2B is a schematic illustration of another demonstrative implementation of a signal processing device, in accordance with the present invention.

Reference is made to FIG. 2B, which is a schematic illustration of another demonstrative implementation of a signal processing device 200, in accordance with the present invention. Device 200 may process signals, for example, images, video files, audio files, or other types of data items or content items. Device 200 may be implemented as a software application and/or a hardware component, as a computer program, a server, a workstation, or the like. Portions of the discussion herein may relate to one or more modules or components of device 200, although some modules or components may be optional, or may not be included in a particular implementation.

In a demonstrative embodiments of the present invention, device 200 may comprise, for example: a similar region recurrence searcher 201 which may comprise a sampling module 202 associated with a sampling distribution 275, as well as a propagation module 203; a dataset 270 of content items (e.g., images, video files, audio files, multimedia files); an optional scaling module 222 able to scale or re-scale content items of dataset 270; an affinity calculator/updater module 271 able to feed other components of device 200 and to generate an affinity output 299 which may be used by a task-specific module 298; a collaborative feedback engine 205 to update and to optionally utilize a collaborative feedback database, e.g., reflecting "search suggestions" dynamically obtained from content items; a sampling distribution updater 272 (which, in a demonstrative implementation, may comprise collaborative feedback engine 205 and a random distribution generator 207) to update sampling distribution 275; and other software modules and/or hardware components. The function and operation of these modules is explained throughout the discussion herein.

For demonstrative purposes, device 200 may utilize efficient collaborative multi-image composition. Generally, finding all matching regions of arbitrary size and shape (between a pair of images, or in a large image collection) is a very hard problem. An efficient randomized composition algorithm may be used by image composition module 204 to simultaneously compose all images in the collection from each other. The image composition algorithm may detect with very high probability the statistically significant compositions within the image collection, in runtime linear in the size of the image collection.

Similar region recurrence searcher 201 may search for "similar regions", as opposed to searching similar patches or similar descriptors. When randomly sampling descriptors across a pair of images, and allowing collaboration between descriptors, large shared regions (of unknown shape, size, or position) may be detected in linear time O(N), where N is the size of the image. In some embodiments of the present invention, the larger the region, the faster it will be found, and with higher probability. This leverages on the "wisdom of crowds of pixels" approach.

The complexity of searching by similar region recurrence searcher 201 for large regions of a single image inside a collection of M images should in principle scale up with the size of the collection: O(NM) for "composing" a single image, and $O(N M^2)$ for "composing" all the images. However, when all the images in the collection are composed simultaneously from each other by image composition module 204, the "wisdom of crowds of images" may be utilized to generate the most significant compositions for each image. Images may be used by collaborative feedback engine 205 to generate "advice" or "suggestions" to each other where to sample and search in the collection, and such "suggestions" may be temporarily stored in an optional collaborative feedback database. Random distribution generator 207 may operate in conjunction with collaborative feedback engine 205, in order to generate the random distribution, thereby allowing sampling distribution updater 275 to modify sampling distribution 272 which, in turn, is used by sampling module 202. Utilization of the collaborative feedback may reduce the computational complexity of the overall composition process dramatically, for example, to O(NM). The average complexity per image may thus remain very small, practically linear in the size of the image O(N), regardless of the size M of the collection. Moreover, this approach may produce a sparse set of reliable affinities (corresponding to the most significant compositions). Such sparsity may be important for good image clustering, and may be obtained via collective decisions made by all the images, or made by a collaborative image clustering module based on collaborative feedback obtained from all the images.

Device 200 may apply a "Similarity by Composition" approach, which may define a similarity measure between a query image Q and a reference image Ref, according to the ease of composing Q from pieces of Ref. This may be employed by affinity calculator/updater 271 for computing affinities between images, and the computed affinities may be stored in an affinity matrix.

The algorithm utilized by device 200 may estimate the likelihood of a region. For example, region R may be represented as an ensemble of descriptors $\{d_i\}$, with their relative positions $\{l_i\}$ within region R. Let p(R|Ref,T) denote the likelihood to find the region $R \subset Q$ in another image Ref at a location/transformation denoted by T (in general, T may be a shift, scaling, rotation). This likelihood may be estimated based on the similarity between the descriptors of R and the corresponding descriptors (according to T) in Ref, as demonstrated in Equation (1):

$$p(R \mid Ref, T) = \frac{1}{Z} \prod_i \exp - \frac{|\Delta d_i(Ref, T)|^2}{2\sigma^2} \qquad (1)$$

In Equation (1), $\Delta d_i(Ref,T)$ is the error between the descriptor $d_i \in R$ and its corresponding descriptor (via T) in Ref. The algorithm may allow for small non-rigid deformations of the region R, by allowing descriptors $d_i$ to slightly deviate from their expected (relative) position $l_i$, while penalizing large deviations $\Delta l_i$ in descriptor positions. Z is a normalization factor. Furthermore, the likelihood of R may be defined as its best match in Ref:

$$p(R \mid Ref) = \max_T p(R \mid Ref, T) \qquad (2)$$

The descriptors $\{d_i\}$ may be chosen to be two types of descriptors (estimated densely in the image), for example, Histograms of Oriented Gradients (HOG) and Local Self-Similarity (LSS). These two descriptors have complementary properties: the HOG may capture local texture information, whereas the LSS may capture local shape information while being invariant to texture (e.g., different clothing). The transformations T may be global shifts of the region R (but allowing small local non-rigid deformations of R).

The clustering algorithm may calculate "statistical significance" of a region R. The clustering algorithm may operate to detect large non-trivial recurring regions across images; however, the larger the region, the smaller its likelihood according to Equation (2). Tiny uniform regions may have the highest likelihood, since they have numerous good matches in Ref. Therefore, it may not be sufficient for a region to match well, but rather, the region should also have a low probability to occur at random. The likelihood ratio may be obtained by utilizing Equation (3):

$$\text{Likelihood Ratio }(R) = \frac{p(R \mid Ref)}{p(R \mid H_0)} \qquad (3)$$

Equation (3) demonstrates the likelihood ratio between the probability of generating R from Ref, versus the probability of generating R at random (e.g., from a "random process" $H_0$). For example, $p(R|H_0)$ may measure the statistical insignificance of a region, since high probability corresponds to low significance. If a region matches well, but is trivial, then its likelihood ratio will be low (thereby inducing low affinities). In contrast, if a region is non-trivial, yet has a good match in another image, its likelihood ratio will be high (thereby inducing high affinity between those images).

The algorithm may efficiently estimate $p(R|H_0)$. For example, the chance of a region R to be generated at random is: $p(R|H_0) = \Pi_i p(d_i|H_0)$, where $\{d_i\}$ are all the descriptors in R. Given a set of images (the images that are to be clustered, or a general set of natural images), D may be defined as the collection of all the descriptors extracted from those images. We define $p(d|H_0)$ to be the probability of randomly sampling the descriptor d from the collection D (or its frequency in D). Estimating this by utilizing Parzen density estimation may be excessively time consuming. Rather, D may be quantized into a small "codebook" $\hat{D}$ of a few hundred codewords. Frequent descriptors in D may be represented well in $\hat{D}$ (e.g., may have low quantization error relative to their nearest codeword); whereas rare descriptors may have high quantization error. This may lead to the following approximation:

$$p(d \mid H_0) = \exp - \frac{|\Delta d_i(H_0)|^2}{2\sigma^2} \qquad (4)$$

In Equation (4), $\Delta d_i(H_0)$ is the error between $d_i$ and its most similar codeword $\hat{D}$.

In a demonstrative experiment, images from a ballet/yoga dataset, and images from an dataset of various animals, were used to display $\Delta d_i(H_0) = -\log p(d|H_0)$. A first color (e.g., red) marked marks descriptors with high error $\Delta d(H_0)$, i.e., descriptors having high statistical significance, or low probability to occur at random. Image regions R containing many such descriptors have high statistical significance (low $p(R|H_0)$). In the ballet/yoga dataset, statistically significant regions coincided with body gestures that are unique and informative to the separation between ballet and yoga. Recurrence of such regions across images may induce strong and reliable affinities for clustering. It is noted that long horizontal edges (e.g., between the ground and sky in some Yoga images, or between the floor and wall in some ballet images) are not statistically significant, since such edges may occur abundantly in many images. Similarly, in the animals' dataset, statistically significant regions coincided with parts of the animals that are unique and informative for their separation (e.g., the monkey's face and hands; the elk's horns). The most informative descriptors for classification tend to have the highest auantization error.

The algorithm may utilize descriptor weighting, to ensure that descriptors are associated with suitable weight. Unlike the common use of codebooks ("bags of descriptors") in classification or clustering, in the present invention the codebook is not used for representing the images. On the contrary, a descriptor which appears frequently in the codebook is "ignored" or gets very low weight, since such descriptor is very frequently found in the image collection and is thus not informative.

Affinity calculator/updater 271 may calculate the "Saving in Bits" obtained by a region R. The optimal (Shannon) Description Length of a random variable x (i.e., the number of bits required to code the variable) is: $DL(x) = -\log p(x)$. Taking the log of Equation (3) yields the following "Savings in Bits":

$$\log \frac{p(R \mid Ref)}{p(R \mid H_0)} = DL(R \mid H_0) - DL(R \mid Ref) \qquad (5)$$

Equation 5 reflects the number of bits saved by generating R from Ref, as opposed to generating R from scratch at random (using $H_0$). Using the quantized codebook $\hat{D}$, the "savings in bits" of Equation 5 may be computed:

$$\log \frac{p(R \mid Ref)}{p(R \mid H_0)} = \alpha + \beta \sum_i |\Delta d_i(H_0)|^2 - |\Delta d_i(Ref)|^2 \qquad (6)$$

In Equation (6), $\alpha$ and $\beta$ are global constants, independent of the region R. Therefore, if a region R is composed of statistically significant descriptors (with high errors $\Delta d_i(H_0)$), and has a good match in Ref (low errors $\Delta d_i(Ref)$), then R will obtain very high "Savings in Bits" because the difference between the two errors is large. In contrast, a large recurring uniform region or a long horizontal edge may hardly yield any "savings in bits", since both errors $\Delta d_i(H_0)$), and $\Delta d_i(\text{Ref})$ will be low, resulting in a small difference. Bit-savings results calculated by affinity calculator/updater 271 may be stored in bit-savings matrix.

The above discussion relates, for demonstrative purposes, to a single region R. When the query image Q is composed of multiple non-overlapping regions $R_1, \ldots, R_r$ from Ref, bit-savings calculator may approximate the total "savings in bits" of Q given Ref, by summing up the "savings in bits" of the individual regions. This forms the affinity between Q and Ref:

$$\text{savings}(Q|\text{Ref}) = \Sigma_{i=1}^{r} \text{savings}(R_i|\text{Ref}) \tag{7}$$

For demonstrative purposes, and as demonstrated in Equations 1, 4, and 6, some implementations may utilize a sum-of-squared differences error. Other implementations may utilize other suitable error measures between descriptors, for example, sum-of-differences, sum-of-absolute-differences, other Lp norm measures, mutual information, correlation, normalized correlation, robust measures, histogram comparison measures, and motion consistency measures. The particular method may be selected by taking into account, for example, the type of descriptors that are used, the type of content item, or other parameters.

Some implementations may utilize two types of local image descriptors, e.g., Histogram of Oriented Gradients (HOG) descriptors and self-similarity descriptors. Other implementations may utilize one or more other local image descriptors or feature descriptors, for example, Scale-Invariant Feature Transform (SIFT) descriptors, Speeded Up Robust Features (SURF) descriptors, shape-context descriptors, local-binary patterns, color descriptors, grey levels, normalized color, normalized grey levels, gradient information, normalized gradient information, and/or other suitable local image descriptor(s). For a dataset of video content items, other suitable descriptor(s) may be used, for example, HOG-3D descriptors, Histogram of Optical Flow (HOF) descriptors, flow fields, normal flows, motion information, time derivatives, normalized time derivatives, and/or other suitable video descriptor(s). For a dataset of audio content items, other suitable descriptors may be used, for example: spectrogram based descriptors, Cepstrum based descriptors, Mel-Frequency Cepstral Coefficients (MFCC), Short Time Fourier Transform (STFT) descriptors, Constant Q-Transform (CQT) descriptors, and/or other descriptors in the spectral domain of the audio signal. Other suitable content descriptors or feature descriptors may be used for datasets that include other types of files (e.g., multimedia files).

Similar region recurrence searcher 201 may perform randomized detection of shared regions. For example, a randomized algorithm may detect large unknown (irregularly shaped) regions which are shared across images. Sampling module 202 may provide random samples, based on sampling distribution 275. The random samples may be used together with the coherence of neighboring pixels (descriptors) to quickly propagate information via propagation module 203. It is noted that similar region recurrence searcher 201 may search for "matching regions", rather than searching for matching patches or matching descriptors.

The theoretical complexity of a Patch-Match algorithm is O(N log N), where N is the size of the image, because Patch-Match spends most of its time seeking good matches for the spurious and isolated descriptors. However, the present invention may seek only large matching regions across images (and may ignore the small spurious distracting matching regions). This may be achieved linear time O(N). In fact, the larger the region, the faster it will be found, with fewer random samples, and with higher probability. Therefore, region-matching may be faster than descriptor-matching, due to a "wisdom of crowds of pixels" approach. The following discussion relates firstly to region detection (growing), and then quantifies (via a series of claims) the number of random samples required to detect a shared region, with high probability, as a function of its size.

Propagation module 203 may utilize a region growing (or region detection) algorithm. For example, let R be a shared region (of unknown shape, size, and/or position) between images $I_1$ and $I_2$. Let $R_1$ and $R_2$ denote the instances of shared region R in images $I_1$ and $I_2$, respectively. The algorithm may find for each descriptor $d_1 \in R_1$ its matching descriptor $d_2 \in R_2$.

For sampling by sampling module 202, each descriptor of $d_1 \in I_1$ may randomly sample S locations in image $I_2$, and may choose the best sample. The complexity of this step is O(SN). The chance of a single descriptor d to "accidently" fall on its correct matching descriptor in image $I_2$ is very small. However, the chance that at least one descriptor from $R_1$ will fall on its correct match in $R_2$ is very high if R is sufficiently large; this probability is quantified in Claim 1 discussed below. Once a descriptor from $R_1$ finds a good match in $R_2$, it propagates this information to all the descriptors in the region. For propagation, each descriptor may choose between its best match, and the match proposed by its spatial neighbors. This may be achieved quickly via two image sweeps (e.g., one sweep from the top downward, and another sweep from the bottom upward). The complexity of this step is O(N).

The overall runtime may be O(SN). In some embodiments of the present invention, the number of random samples S per descriptor may be a small constant (e.g., as demonstrated in a First Claim for sufficiently large regions), and the overall detection or growing of region R may be linear: O(N).

Applicants have developed a series of four Mathematical Claims which may analyze and quantify the number of samples S required to detect shared regions R across images (e.g., pairs of images, or collections of images) at high probability. This is analyzed as a function of the relative region size in the image |R|/N, the desired detection probability p, and the size M of the image collection.

A First Claim may relate to a single shared region between two images. Let R be a region (of unknown shape, size and/or location), which is shared by two images $I_1$ and $I_2$. Claim 1(a) states that using S random samples per descriptor, guarantees to detect the region R with a probability p such that:

$$p \geq (1 - e^{-S|R|/N}) \tag{8}$$

Furthermore, Claim 1(b) states that to guarantee the detection of the region R with a probability p such that $p \geq (1-\delta)$, requires the number of random samples S to be:

$$S = \frac{N}{|R|} \log\left(\frac{1}{\delta}\right) \tag{9}$$

Figure 3A:
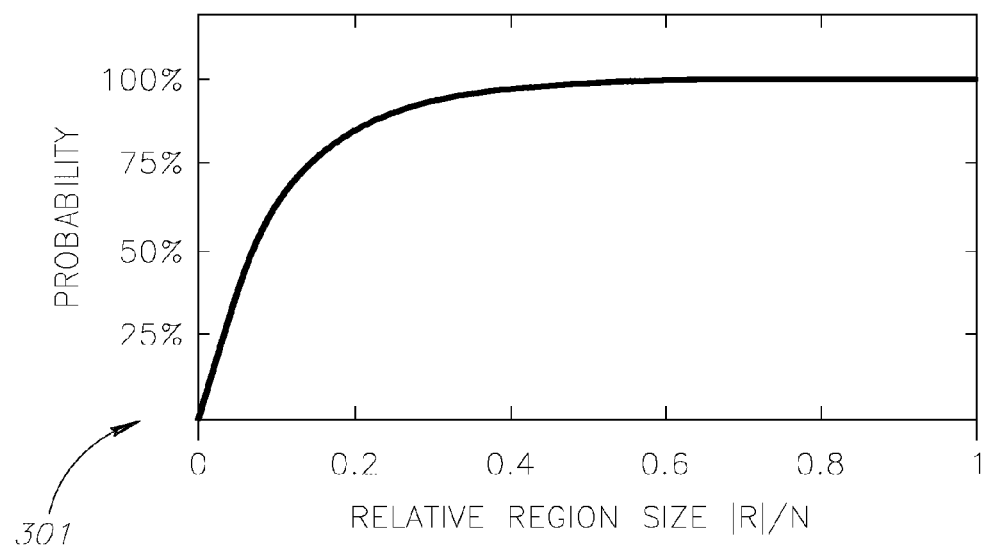
FIG. 3A is a schematic illustration of a graph demonstrating the probability to detect a shared region as a function of the relative region size, in accordance with the present invention.
Figure 3B:
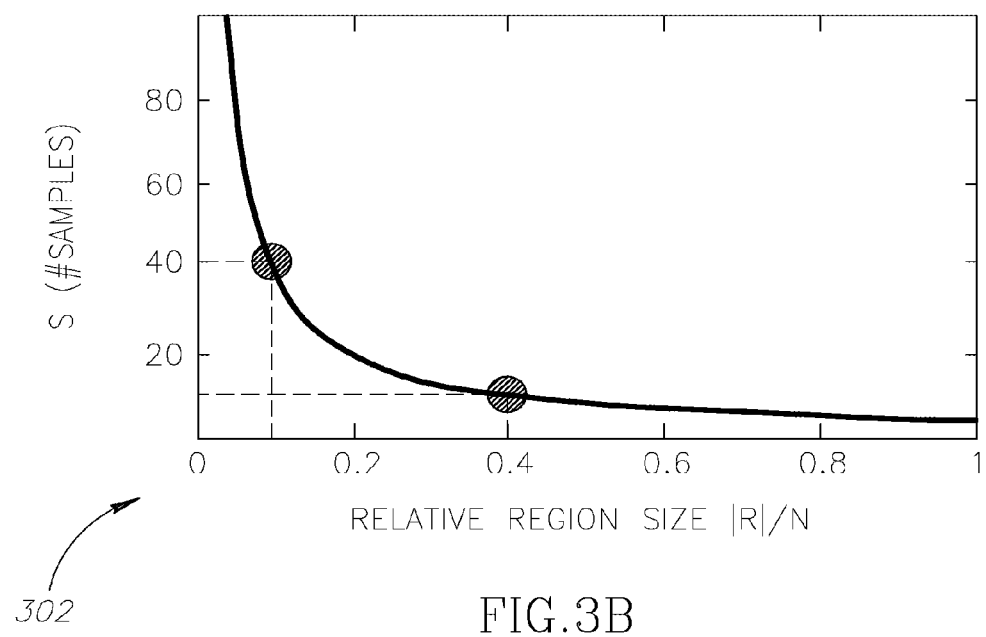
FIG. 3B is a schematic illustration of a graph demonstrating the number of samples required to guarantee the detection of a shared region with high probability, in accordance with the present invention.

Reference is made to FIGS. 3A and 3B which demonstrate the terms in Claim 1(a) and Claim (b), respectively. FIG. 3A is a schematic illustration of a graph 301 demonstrating the probability to detect a shared region R as a function of the relative region size |R|/N, when using S=10 random samples per descriptor. FIG. 3B is a schematic illustration of a graph 302 demonstrating the number of samples S required to guarantee the detection of a shared region R with a probability $p \geq 98\%$ as a function of the relative region size |R|/N. For example, to detect a shared region R which is 10% of the size of the image N, with probability p≥98%, may require only S=40 random samples per descriptor, at an overall runtime of O(40/V), which is linear in N.

A Second Claim may relate to multiple shared regions between two images. Let $R_1, \ldots, R_L$ be L shared non-overlapping regions between two images $I_1$ and $I_2$. Accordingly, Claim (2) states that if $|R_1|+|R_2|+\ldots|R_L|=|R|$, then it is guaranteed to detect at least one of the regions $R_i$ with the same probability p and using the same number of random samples S as in the case of a single shared region of size $|R|$.

In a demonstrative example, at least 40% of a first image may be composed using several (smaller) pieces of a second image. According to graph 302 of FIG. 3B, when using only S=10 random samples per descriptor, it is guaranteed to detect at least one of the shared regions with probability p≥98%. Moreover, as demonstrated in graph 301 of FIG. 3A, this shared region will most likely be one of the largest regions in the composition, since small regions have very low probability of being detected with S=10. (e.g., a region of size 1% has only 10% chance of being detected).

Similar region recurrence searcher 201 may detect a shared region between a query image and at least one other image in a large collection of M images. For demonstrative purposes, in a first implementation all the images in the collection may be "partially similar" to the query image. For example, two images are "partial similar" if they share at least one large region (e.g., a region of at least 10% of the image size). The shared regions $R_i$ between the query image and each image $I_i$ in the image collection may be possibly different ($R_i \neq R_j$).

A Third Claim relates to detection of shared regions between an image and an entire image collection. Let $I_0$ be a query image, and let $I_1, \ldots, I_M$ be images of size N which are "partially similar" to the query image $I_0$. Let $R_1, \ldots, R_M$ be regions of size $|R_i| \geq \alpha N$ such that Ri is shared by images $I_0$ and $I_i$ (the regions $R_i$ may overlap in $I_0$). Claim (3) states that busing S random samples which is equal to:

$$S = \frac{1}{\alpha}\log\left(\frac{1}{\delta}\right) \quad (10)$$

per each descriptor in $I_0$, it is guaranteed with probability p ≥(1−δ) to grow at least one of the regions $R_i$.

Accordingly, if similar region recurrence searcher 201 utilizes the same number of random samples S per descriptor as in the case of two images, but now scatters them randomly across all the images in the collection, it is still guaranteed to detect at least one of the shared regions with high probability. In accordance with the present invention, this holds true regardless of the number of images M in the collection. For example, if the regions are at least 10% of the image size (α=0.1), then S=40 random samples per descriptor in $I_0$, distributed randomly across $I_1 \ldots, I_M$, would suffice to detect at least one shared region $R_i$ with probability p≥98%.

In some implementations of the present invention, only a portion of the images in the collection are "partially similar" to $I_0$, and those may be "hidden" among many other non-similar images in the collection. For example, let the number of "partially similar" images be M/C, where 1/C may indicate the portion of the "partially similar" images in the collection. It may be calculated that in such case, the detection algorithm may need to utilize C times more samples, than in the previous case in which all the images in the collection were "partially similar", in order to find at least one shared region between $I_0$ and one of the "partially similar" images. For example, if there are 4 clusters, and if all images in each cluster are "partially similar", then C may be equal to 4. In some implementations of the present invention, the number of clusters C may be much smaller or significantly smaller than the total number of images M in the collection, such that C<<M.

The algorithm in accordance with the present invention may apply the region search process simultaneously, for example, to all images against each other. Each location (descriptor) in each image may randomly sample a total of S locations (descriptors) from the entire image collection, randomly scattered across the image collection). The algorithm may operate such that in a single "simultaneous iteration", almost all the images in the collection generate at least one strong connection (e.g., find at least one large shared region) with at least one other image in the collection.

A Fourth Claim may relate to detection of shared regions among multiple images in an image collection. For example, in accordance with the present invention, each image in the collection may be "partially similar" to at least M/C other images in the collection; the shared regions are at least 10% of the image size; and the number of random samples per descriptor is S=40 C, sampled at random from the entire image collection. Claim (4) states that at least 95% of the images in the collection are guaranteed to generate at least one strong connection (find at least one large shared region) with at least one other image in the image collection with extremely high probability; the high probability rapidly grows with the number of images, and is almost 100% for M≥500).

Accordingly, after one iteration, 95% of the images in the collection will generate strong connections to other images in the collection. In accordance with the present invention, very few iterations of the algorithm of a collaborative image clustering module may thus suffice to guarantee that all images in the collection have at least one such strong connection to other images in the collection.

Figure 4:
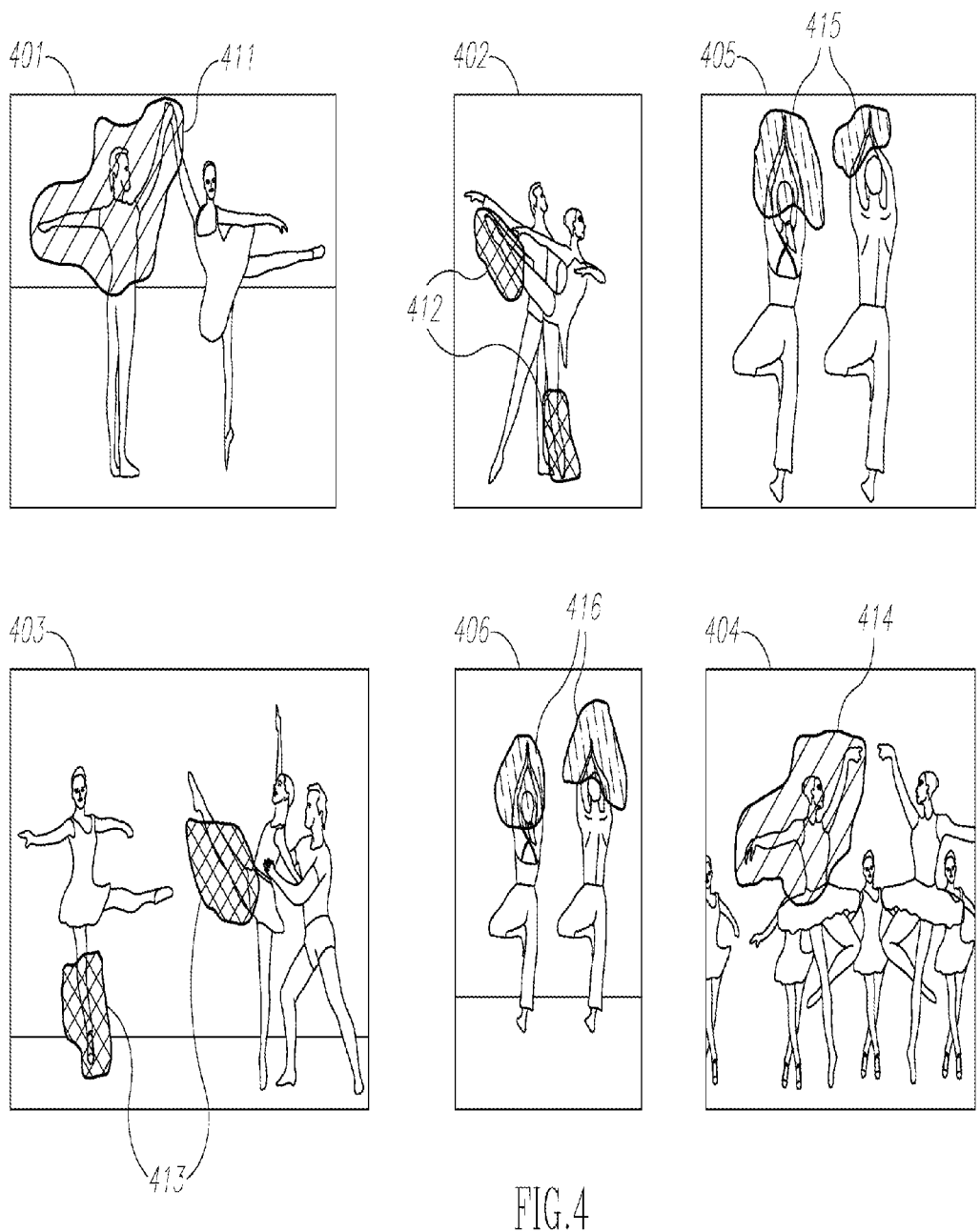
FIG. 4 is a schematic illustration of images from a collection of mixed images, demonstrating connecting regions which may be detected by the algorithms of the present invention.

Reference is made to FIG. 4, which is a schematic illustration of images 401-406 from a collection of mixed ballet images and yoga images, demonstrating connecting regions 411-416 which may be detected by the algorithms of the present invention. Images 401-404 are ballet images, whereas images 405-406 are yoga images. Region 411 in ballet image 401 may be identified by the algorithms of the present invention as having strong connection to region 414 of ballet image 404. Two regions 412 in ballet image 402 may be identified by the algorithms of the present invention as having strong connection to two regions 413 of ballet image 403. Two regions 415 in yoga image 405 may be identified by the algorithms of the present invention as having strong connection to two regions 414 of yoga image 404.

Referring again to FIG. 2B, as described above, similar region recurrence searcher 201 may operate such that each image may independently detect its own shared regions within the image collection, using only its "image-internal wisdom" which may be referred to as "wisdom of crowds of pixels". In a collaborative image clustering algorithm, collaboration among images may significantly improve the shared regions detection process. Furthermore, each image may provide collaborative feedback or "suggestions" to other images on where such other images should sample and search within the collection.

For example, referring again to FIG. 1, image $I_0$ has strong affinity to images $I_1, \ldots, I_4$. Therefore, in a subsequent iteration, image $I_0$ may suggest to images $I_1, \ldots, I_4$ to search for matching regions in each other. For example, image $I_3$ may be "encouraged" by image $I_0$ to sample more in image $I_1$ in the next iteration. The shared regions between image $I_1$ and image $I_3$ need not be the same as those they share with image $I_0$ (e.g., the shared regions may pertain to different body organs). The guided sampling process via multi-image collaboration may significantly speed up the process, and may reduce the required number of random samples and iterations. Within a few iterations, strong connections may be generated among images belonging to the same cluster, by utilizing this collaboration which may be referred to as the "wisdom of crowds of images".

In accordance with the present invention, instead of exhausting all the random samples at once, region detection may be performed iteratively, each time using only a small number of random samples obtained by sampling module 202. Most of the detected regions in the first iteration may be large, since (according to Claims (1) and (2) above, and in view of FIG. 4A) only large regions have high enough probability to be detected given a small number of random samples. Subsequently, as more iterations are performed, more random samples may be added, and smaller regions may also emerge. The detection of smaller shared regions may be guided by the connections already made (via the larger shared regions), as reflected in the affinity matrix. This may increase the chance that these small regions are also meaningful, thereby strengthening connections within the cluster, rather than detecting small distracting coincidental regions.

In accordance with the present invention, the collaborative clustering algorithm may begin with uniform random sampling across the entire image collection. For every pair of connected images (via detected shared regions), their affinity may be set to be their total pairwise "savings in bits" (summed over all their shared regions), and the affinity matrix (and optionally, a bit-savings matrix) may be updated. At each iteration, sampling density distribution 275 of each image may be modified by sampling distribution updater 275 according to "suggestions" made by (or collaborative feedback obtained from) other images, guiding sampling module 202 where to sample in the next iteration. In accordance with the present invention, after a few iterations, the resulting affinity output 299 may be fed to task-specific module 298, for example, a Normalized Cut (N-Cut) module which may apply an N-Cut algorithm in order to obtain the desired clusters.

The N-Cut algorithm (or other graph partitioning algorithm) may implicitly rely on two assumptions: an assumption that there are enough strong affinities within each cluster, and an assumption that the affinity matrix is relatively sparse (with the hope that there are not too many connections across clusters). The sparsity assumption may be important for computational reasons, as well as to guarantee the quality of the clustering. This may be obtained by forcefully and/or "blindly" sparsifying the affinity matrix (e.g., by keeping only the top 10 log M values in each row). The clustering algorithm of the present invention may achieve both conditions via the "suggestion-based" multi-image collaborative search. In accordance with the present invention, the "suggestions" made by images to each other may rapidly generate (within a few iterations) strong intra-cluster connections (e.g., connections among images between the same cluster), and very few inter-cluster connections (e.g., connections among images belonging to different clusters).

The following pseudo-code, denoted Code 1, demonstrates a collaborative image clustering algorithm in accordance with the present invention, which may be implemented by using a computing device, or a system or device which may include hardware components and/or software modules:

Code 1

```
Initiate affinity matrix to zero: A = 0;
Initiate sampling distributions to uniform: P = U;
for iteration t = 1, . . . , T do
    for image i = 1, . . . , M do
        1.    Randomly sample according to distribution P_i
              using S samples;
        2.    Grow the shared regions,
              allowing small non-rigidities,
              resulting in the mapping F_1;
        3.    Update row i of B ("Bit-Saving") according to
              mapping F_i;
    end
    Update affinity matrix: A = max(A, B);
    Update P (using "wisdom of crowds of images");
    If (t mod J) = 0 (namely, every J-th iteration),
              Then reset the mappings F_1, . . . , F_M;
end
Impose symmetry on the affinity matrix A
        by A = max (A, A^T);
Apply N-cut on A to obtain K image clusters;
```

The input that Code 1 may receive is a collection of unlabeled images $I_1, \ldots, I_M$. The output that Code 1 may generate is a set of K image clusters; it is assumed that the value of K is known. In Code 1, Fi denotes the mapping between the descriptors of image Ii to their matching descriptors in the image collection. For each descriptor, Fi contains the index of the image of its match and its spatial displacement in that image. Fi tends to be piece-wise smooth in areas where matching regions were detected, and chaotic elsewhere. A denotes the affinity matrix of the image collection. The algorithm may construct and fill the affinity matrix using the information obtained by composing images from each other. B denotes the "Bit-Saving" matrix at each iteration. The value Bij is "Saving in Bits" contributed by image Ij to the composition of image Ii, at a specific iteration. P denotes the "sampling distribution" matrix at each iteration. Pij is the prior probability of a descriptor in image Ii to randomly sample descriptors in image Ij when searching for a new candidate match. Pi (the $i_{th}$ row of P) determines how image Ii will distribute its random samples across all other images in the collection in the next iteration. U denotes the matrix corresponding to the uniform sampling distribution across images, e.g., all the matrix entries equal to 1/(M−1), except for zeros on the diagonal.

In the step of randomly sampling according to distribution Pi, each descriptor samples descriptors at S random locations in the image collection. Each of the S random samples is sampled in two steps: an image index j=1, . . . , M is sampled according to distribution Pi, and then a candidate location in image Ij is sampled uniformly. If one of the new candidates for this descriptor improves the current best match, then it becomes the new match.

In the step of allowing small non-rigidities, the algorithm may add a local refinement sampling phase at the vicinity of the current best match, thereby allowing for small non-rigid deformations of matched regions. This step may be implemented, for example, similarly to the local refinement phase of a Patch-Match algorithm.

In the step of updating the bit-savings matrix B, the detected ("grown") regions need not be explicitly extracted in order to compute the "Savings-in-Bits". Instead, for each image Ii, the algorithm may first disregard all the descriptors which are spuriously mapped by Fi (e.g., mapped in an inconsistent way to their surrounding). Let $\chi_i$ denote all remaining descriptors in image Ii. These descriptors are part of larger regions grown in Ii. Accordingly, B(i,j) may be estimated using the individual pixel-wise "Savings-in-Bits" induced by the mapping Fi, summed over all the descriptors in $\chi_i$ which are mapped to image:

$$B(i,j) = \Sum_{k \in \chi_i, F_i(k) \to I_j} |\Delta d_k(H_0)|^2 - |\Delta d_k(I_j)|^2 \qquad (11)$$

where $\Delta d_k(I_j)$ is the error between descriptor $d_k$ in Ii and its match in $I_j$ (induced by Fi).

In the step of updating P (the "wisdom of crowds of images"), a Markov chain (a "Random Walk") may be considered on a graph whose nodes are the images in the collection. The transition probability matrix may be set between nodes (images) $\hat{B}$ to be equal to the "Bit-Savings" matrix B, after normalizing each row to 1. For example, $\hat{B}(i, j)$ may reflect the relative contribution of each image to the current composition of image $I_i$. Starting from state i (image $I_i$) and going one step in the graph, may get a distribution equal to $\hat{B}i$ (the image's own "wisdom"). Similarly, going two steps in the graph may get a distribution $\hat{B}_i^2$ (the "wisdom" of the neighboring image). Using these facts, the sampling distributions in P may be updated by sampling distribution updater, based on the operations of collaborative feedback engine 205 and random distribution generator 207, as follows:

$$P = w_1 \hat{B} + w_2 \hat{B}^2 + w_3 W \qquad (12)$$

where the sum of the weights w1+w2+w3=1. The first term, $\hat{B}$, encourages each image to keep sampling in those images where it already found initial good regions. The second term, $\hat{B}^2$, contains the suggestions that images make to each other. For example, if image $I_i$ found a good region in image $I_j$ (high $\hat{B}_{ij}$), and image $I_j$ found a good region in image $I_k$ (high $\hat{B}_{jk}$), and then $\hat{B}_{ik}^2$ will be high, suggesting that $I_i$ should sample more densely in image $I_k$ in the next iteration. The third term, U, promotes searching uniformly in the collection, to avoid getting "stuck" in local minima. The weights w1, w2, w3 may gradually change with the J internal iterations. For example, at the beginning of the process, more weight may be given to uniform sampling; and at the end of the process, more weight may be given to the guided sampling.

The step of resetting the mappings {Fi} may be done every few iterations (e.g., J=3) in order to encourage the images to restart their search in other images and look for new connections.

Scaling module 222 may optionally allow the collaborative algorithm to be adapted to incorporate and handle scale invariance of content items in dataset 270. For example, for each image (or other content item) in dataset 270, a cascade of multi-scale images may be generated by image scaling module 222 at relative scales (for example, scales of 1, 0.7, 0.5, and 0.35 relative to the original image size, in each dimension). The region detection algorithm of similar region recurrence searcher 201 may be applied to the entire multi-scale collection of images, thereby allowing region growing also across different scales between images. The multi-scale cascade of images originating from the same input image may be associated with the same entity in affinity matrix A. The above is only a demonstrative implementation of scaling module 222, and other suitable types or methods of scaling may be used, alternatively or cumulatively. For example, scaled invariant features may be used, or may be computed in the original scale of the images (or content items) without necessarily increasing the size of dataset 270. Propagation module 203 may take into account vicinities not only in space (x,y) but rather, also in scale and/or orientation of such features. Other suitable types of scaling may be used.

It is noted that all matrix computations and updates (for example, calculating max(A, B), calculating $\hat{B}^2$, updating P, or other operations) may be efficient, in terms of memory and computation, since the matrix B is sparse. Its only non-zero entries correspond to the image connections generated in the current iteration. In some embodiments, for example, the number of iterations may be set to be T=10 $\log_{10}$ M, as a recommended sparsity of the affinity matrix. The algorithm may directly estimate a good set of sparse affinities, e.g., as opposed to computing a full affinity matrix and then sparsifying it). T may typically be a small number; for example, for M=1,000 images, T may be equal to 30; and for M=10,000 images, T may be equal to 40. The complexity of each iteration is O(NM), and the overall complexity of the clustering algorithm is O (NM log 10 (M)), which is almost linear in the size of the image collection (NM).

Applicants have tested an implementation of the collaborative image clustering algorithm of the present invention on a variety of image collections, including Caltech image dataset, ETHZ image dataset, and PASCAL image dataset, and including purely unsupervised category discovery. The experiments results indicate that the algorithm of the present invention produces more accurate image clustering results, relative to conventional methods of image clustering. In some embodiments of the present invention, restricting the spatial search range of descriptors to no more than 25% of the image size (around each descriptor), may further improve (or may significantly improve) the clustering results, as such a restriction enforces a weak prior on the rough geometric arrangement within the image.

Applicants have further tested an implementation of the collaborative image clustering algorithm of the present invention on tiny image collections. For example, a ballet-yoga database was created to include 20 ballet images and 20 yoga images, and the clustering algorithm of the present invention was run in order to cluster the 40 images into either the ballet cluster or the yoga cluster. As a result, 37 out of the 40 image were correctly clustered, corresponding to a mean purity of 92.5%. The generated ballet cluster contained 19 ballet images and 1 yoga image (purity=95%); and the generated yoga cluster contained 18 yoga images and 2 ballet images (purity=90%). Other suitable results may be obtained in accordance with the present invention.

The "Collaborative Composition" approach of the present invention may be utilized or extended in order to address a variety of visual inference tasks, for example, image classification, image retrieval, label transfer (annotation), video clustering, video analysis, or the like. Such tasks may be implemented through task-specific module 298, or by using other suitable components.

In an image classification task, an image classification algorithm may utilize an algorithm which may receive a set of images labeled with different categories, and may attempt to classify correctly a new image which belongs to one of the categories. Such classification may also be used to "learn" or inherent one or more label(s) or annotation(s) from the correct category. The Collaborative Composition approach of the present invention may be used, for example, for detecting "informative regions" within each category, and/or for performing the classification itself.

For example, an image classification algorithm may detect "informative regions" within each category; and the Collaborative Composition approach may allow searching a category efficiently and in a meaningful way, when checking if a new image belongs to that category. This may be important when handling complex categories, where there is a lot of intra-category variability in scale, appearance and shape and a lot of inter-category similarity due to background clutter. The Collaborative Composition approach may further allow utilization of high-order statistics even if the number of labeled images is small.

Furthermore, when classifying a new image, instead of comparing the new image to each category sequentially, the collaborative randomized algorithm may be used, as well as the "informative regions" detected for each category, in order to identify the correct category, namely, the category which randomly creates the strongest affinities to the image. This may also provide a means for localizing the object of a relevant category in a new image.

In an image retrieval task, traditionally, each image searches by itself for similar images. Instead, an image retrieval algorithm in accordance with the present invention may utilize a collaborative search of multiple images simultaneously, such that images may search for similar images together by "suggesting" to each other where to search next. These suggestions may be dominated by images that were already identified as similar to each image. This collaboration will make the retrieval more efficient (faster retrieval) and more accurate (better retrieval).

An annotation algorithm may perform a label transfer (or annotation) task, based on partial labels or partial information may exist about some of the images in an image collection (e.g., object masks or boxes). The algorithm of the present invention may be adjusted for annotation or for label transfer, in order to propagate information to unlabeled images. This may be used in order to automatically segment or detect objects and mark areas as corresponding to a certain scene.

Analogously to images, the present invention may be extended from 2D spatial information to 3D space-time information. This approach may allow, for example, detection of shared video events ("space-time regions"), unsupervised clustering of videos into complex dynamic categories, fast video search, video classification (unsupervised, semi-supervised, or supervised), video labeling, video annotation, action localization, recommendation of similar videos, or the like. The collaboration among video clips or video files (or other suitable types of files, for example, audio files, multimedia files) may be even more important than in images, since video-related tasks and problems may have higher complexity (dimensionality).

Some implementations of the present invention may be utilized in conjunction with, or may operate in conjunction with, one or more devices, systems and/or methods that are described in U.S. Pat. No. 8,200,648 entitled "Data Similarity and Importance using Local and Global Evidence Scores", which is hereby incorporated by reference in its entirety.

Some implementations of the present invention may be utilized in conjunction with, or may operate in conjunction with, one or more devices, systems and/or methods that are described in U.S. patent application Ser. No. 11/909,169, entitled "Detecting Irregularities", published as US 2008/0208828, which is hereby incorporated by reference in its entirety.

The present invention may be implemented by utilizing a device comprising suitable hardware components and/or software modules. Such device may be or may comprise, for example, a computer, a computing device, a server, a workstation, a personal computer, a laptop computer, a tablet, a portable computing device, a web server, a server of a search engine website or service, a server of a social network website or a social network service, or the like. Such device may comprise, for example, a processor, a central processing unit (CPU), a digital signal processor (DSP), an integrated circuit (IC), one or more processing cores or controllers, one or more buffers or accumulators or databases, a memory unit, a storage unit, an input unit (e.g., keyboard, mouse, touch-pad, touch-screen, microphone), an output unit (e.g., display unit, monitor, screen, audio speakers), a power source, a wireless transceiver, a wired transceiver, an operating system (OS), one or more applications, and/or other suitable hardware components and/or software modules.

The present invention may optionally be implemented by using a software application which may reside on a storage medium or storage article. For example, a storage article may store machine-readable code or program or instructions, which may be executed by a machine or a processor or a computing device, in order to cause such machine or processor or computing device to perform one or more operations of the present invention. Optionally, the present invention may be implemented by a software application which may be downloaded (e.g., from an "application store" or "app store") or may be otherwise obtained (e.g., may be pre-installed by a supplier or provider of computing devices). Other suitable implementations may be used.

Functions, operations, components and/or features described herein with reference to one or more embodiments of the present invention, may be combined with, or may be utilized in combination with, one or more other functions, operations, components and/or features described herein with reference to one or more other embodiments of the present invention.

While certain features of the present invention have been illustrated and described herein, many modifications, substitutions, changes, and equivalents may occur to those skilled in the art. Accordingly, the claims are intended to cover all such modifications, substitutions, changes, and equivalents.

What is claimed is:

1. A computer implemented method of searching for similar target content-items for a plurality of source content-items, all stored in at least one memory unit the method comprising:
   for each of said plurality of source content-items, searching for similar target content-items in a dataset, while taking into account collaborative feedback exchanged among at least some of currently-searched said plurality of source content-items;
   wherein said searching further comprising at least one of:
      measuring similarity between each one of said source content-items and a small subset of target content-items in said dataset, said small subset is unique to each one of said source content-items and is determined by said collaborative feedback; and
      computing similarity-by-composition by measuring similarity of detected shared regions among said source content-items and said target content-items.

2. The method of claim 1, wherein said plurality of source content-items are contained in said dataset of target content-items.

3. The method of claim 1, wherein detecting said shared regions comprises:
   for source descriptors of a source content-item, randomly sampling target descriptors among target content-items; and
   propagating good matches of source-target descriptors to neighboring descriptors in said source content-item and in one or more matching target content-items.

4. The method of claim 3, wherein said randomly sampling comprises at least one of:
   uniform random sampling, and
   randomly sampling by utilizing a modifiable sampling distribution.

5. The method of claim 4, comprising:
dynamically modifying said modifiable sampling distribution between two consecutive search iterations, based on said collaborative feedback.

6. The method of claim 4, wherein said modifiable sampling distribution is specific to said source content-item.

7. The method of claim 1, wherein said detected shared regions are at least one of:
large shared regions, and
statistically significant regions.

8. The method of claim 1, wherein said measuring similarity of detected shared regions comprises computing a likelihood ratio according to an equation:

$$\text{Likelihood Ratio } (R) = \frac{p(R \mid Ref)}{p(R \mid H_0)}$$

wherein R is a region in one of said source content-items,
wherein Ref is one of said target content-items which shares a similar region,
wherein p (R|Ref) measures a degree of similarity between said region R in said source content-item and said similar region in said target content-item,
wherein p (R|$H_0$) measures a likelihood of said region R to occur at random.

9. The method of claim 8, wherein said degree of similarity is a function of at least one of the following: sum-of-differences, sum-of-squared differences, sum-of-absolute-differences, an Lp norm measure, mutual information, correlation, normalized correlation, a robust measure, a histogram comparison measure, a motion consistency measure, and a probability measure.

10. The method of claim 8, wherein p(R|X)=$\Pi_i$p ($d_i$|X), wherein said $d_i$ are descriptors composing said region R.

11. The method of claim 10, wherein said descriptors are at least one of:
an image descriptor, a Scale-Invariant Feature Transform (SIFT) descriptor, a Speeded Up Robust Features (SURF) descriptor, a Histogram Oriented Gradients (HOG) descriptor, a shape-context descriptor, a self-similarity descriptor, a local-binary pattern descriptor, a color descriptor, a greyscale descriptor, a normalized color descriptor, a normalized greyscale descriptor, a gradient based descriptor, a normalized gradient based descriptor,
a video descriptor, a HOG-3D descriptor, a Histogram of Optical Flow (HOF) descriptor, a flow field based descriptor, a normal flow based descriptor, a motion based descriptor, a temporal derivative based descriptor, a normalized temporal derivative based descriptor,
an audio descriptor, a spectrogram based descriptor, a Cepstrum based descriptors, a Mel-Frequency Cepstral Coefficient (MFCC), a Short Time Fourier Transform (STFT) descriptor, a Constant Q-Transform (CQT) descriptor, a descriptor in the spectral domain of an audio signal.

12. The method of claim 8, wherein said p(R|$H_0$) is estimated by utilizing an error of descriptors composing said region R with respect to a quantized codebook of descriptors.

13. The method of claim 12, wherein said error of at least one of said descriptors is an error computed with respect to at least one nearest neighbor of said at least one of said descriptors in said quantized codebook.

14. The method of claim 12, comprising:
generating said quantized codebook from a collection of descriptors by at least one of:
k-means clustering of said collection of descriptors,
hierarchal clustering of said collection of descriptors,
random sampling from said collection of descriptors.

15. The method of claim 1, wherein said content-items comprise at least one of:
images, video sequences, and audio items.

16. The method of claim 1, wherein said small subset comprises also a randomly sampled small subset generated by randomly sampling based on a sampling distribution, wherein said sampling distribution comprises at least one of:
a uniform distribution,
a non-uniform distribution, and
a dynamically modifiable sampling distribution based on said collaborative feedback.

17. The method of claim 16, comprising:
updating said modifiable sampling distribution, for a particular source content-item, by utilizing a function that comprises at least one of the following:
a first sampling distribution component corresponding to a subset in which said particular source content-item found other similar content items;
a second sampling distribution component corresponding to a subset in which another, similar, content-item found similar content-items; and
a third sampling distribution component corresponding to uniform sampling of said dataset.

18. The method of claim 1, wherein said small subset comprises one or more target content-items that are suggested for searching based on collaborative feedback from one or more source content-items.

19. The method of claim 1, wherein the collaborative feedback comprises suggestions obtained from source content-items indicating to each other where to sample in said dataset in a subsequent search iteration.

20. The method of claim 1, wherein the collaborative feedback comprises at least a sparse set of meaningful affinities among source content-items.

21. The method of claim 1, comprising:
based on affinity output of the searching, performing at least one of: content-item clustering, content-item classification, content-item retrieval, detecting informative content-items, localization of information within content-items, label transfer, annotation, and generating links between content-items.

22. The method of claim 1, wherein said measuring similarity between each one of said source content-items and said small subset of said target content-items in said dataset comprises summing up savings-in-bits (savings) according to an equation:

$$\text{savings}(Q|\text{Ref}) = \Sigma_{i=1}^{r} \text{savings}(R_i|\text{Ref})$$

wherein $R_1$ is region i out of r regions in one of said source content-items Q,
wherein Ref is one of said target content-items which shares at least one similar region.

23. A computing device, having one or more memory units, for searching for similar target content-items for a plurality of source content-items, all stored in at least one of said memory units, the computing device comprising:
a searcher module, stored in at least one of said memory units, configured to search for each of said plurality of source content-items, for similar target content-items in a dataset, while taking into account collaborative feedback exchanged among at least some of currently-searched said plurality of source content-items;

an affinity calculator, stored in at least one of said memory units, configured to measure similarity between each one of said source content-items and a small subset of target content-items in said dataset, said small subset is unique to each one of said source content-items and is determined by said collaborative feedback; and an output unit, configured to output searching results of said searching module.

24. The computing device of claim 23, wherein said plurality of source content-items are contained in said dataset of target content-items.

25. The computing device of claim 23, wherein said affinity calculator computes similarity-by-composition by measuring similarity of detected shared regions among said source content-items and said target content-items.

26. The computing device of claim 25, comprising:

a sampling module, stored in at least one of said memory units, configured to randomly sample for source descriptors of a source content-item, target descriptors among target content-items; and a propagation module, stored in at least one of said memory units, configured to propagate good matches of source-target descriptors to neighboring descriptors in said source content-item and in one or more matching target content-items.

* * * * *